Jan. 3, 1967   W. R. EDWARDS   3,295,410
RETRO EJECT BOMB RACK
Filed Oct. 29, 1964   3 Sheets-Sheet 1

INVENTOR
WILLIAM R. EDWARDS

BY Claude Funkhouser
ATTORNEY
Stanley N. Garber
AGENT

Jan. 3, 1967 W. R. EDWARDS 3,295,410
RETRO EJECT BOMB RACK
Filed Oct. 29, 1964 3 Sheets-Sheet 2

United States Patent Office 3,295,410
Patented Jan. 3, 1967

3,295,410
RETRO EJECT BOMB RACK
William R. Edwards, California, Md., assignor to the United States of America as represented by the Secretary of the Navy
Filed Oct. 29, 1964, Ser. No. 407,593
4 Claims. (Cl. 89—1.5)

The invention described herein may be manufactured and used by or for the Government of the United States of America for governmental purposes without the payment of any royalties thereon or therefor.

The present invention relates to article dispensing and more particularly to a bomb and/or stores ejector for an aircraft.

In the field of aircraft bomb ejection, it has been the general practice to employ either a vertical drop bomb rack wherein a plurality of bombs are stacked one on top of the other for sequential vertical release through bomb bay doors, or a retro release rack wherein the bombs are ejected rearwardly in a plane generally parallel to the longitudinal axis of the aircraft. The vertical drop bomb rack experienced much success and was, in fact, used almost exclusively by World War II bombers. However, with the advent of the supersonic jet aircraft this type of bomb rack has proven to be unsatisfactory since severe tumbling of the bomb occurs as it is released into the supersonic air stream. Therefore, in precision bombing by high speed aircraft, the vertical drop bomb rack has been generally discarded in favor of the retro eject bomb rack. In the latter type of bomb rack, deployment is along the long axis of inertia of the bomb and in line with the air stream so that the bomb lays out naturally and falls without tumbling.

Although retro eject bomb racks of the prior art have generally served the purpose, they have not proven entirely satisfactory under all conditions of service since these racks normally utilize a rotating magazine feeder mechanism which sequentially positions the bombs to be deployed in front of an opening in either the aircraft or the rack, thereby to permit ejection of same. The major difficulties encountered in this type of rack have been the excessive weight and complicated structure required to rotate the magazine feeder mechanism. Obviously, in aircraft equipment, it is highly desirable to utilize equipment of minimum weight and complexity.

The general purpose of this invention, therefore, is to provide a retro eject bomb rack which embraces all of the advantages of similarly employed bomb racks and possesses none of the aforedescribed disadvantages. To attain this, the present invention utilizes a stationary magazine in conjunction with a unique rotary trigger bomb release mechanism thereby obviating the excessive structural weight requirements and complicated mechanisms of the aforementioned rotary magazine bomb racks.

Accordingly, an object of the present invention is to provide an improved retro eject bomb rack.

Another object is to provide a retro eject bomb rack which is light in weight and characterized by simplicity of construction.

A further object of the invention is to provide a retro eject bomb rack incorporating a stationary magazine mechanism.

A still further object of the invention is to provide a unique rotary triggering mechanism which is light in weight and simple in construction and which maintains the bombs securely locked in the magazine prior to deployment.

Still another object of the invention is to provide a bomb rack wherein bomb deployment is along the long axis of the bomb and always in line with the air stream so that the bomb lays out at a desired altitude and falls without tumbling.

Other objects and many of the attendant advantages of this invention will be readily appreciated as the same becomes better understood by reference to the following detailed description of a preferred embodiment of the invention as illustrated in the accompanying drawings in which.

Figure 1:
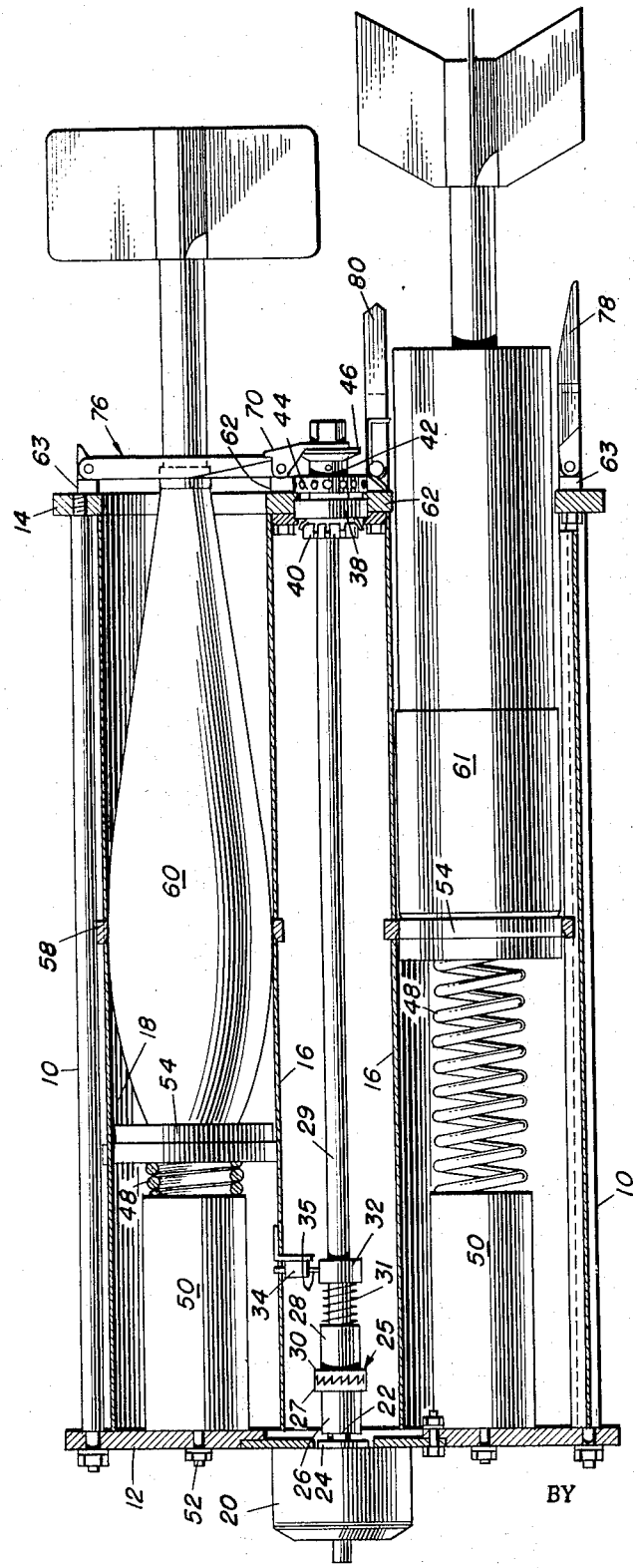
FIG. 1 is a side elevation view partly in section showing a preferred embodiment of the invention.
Figure 2:
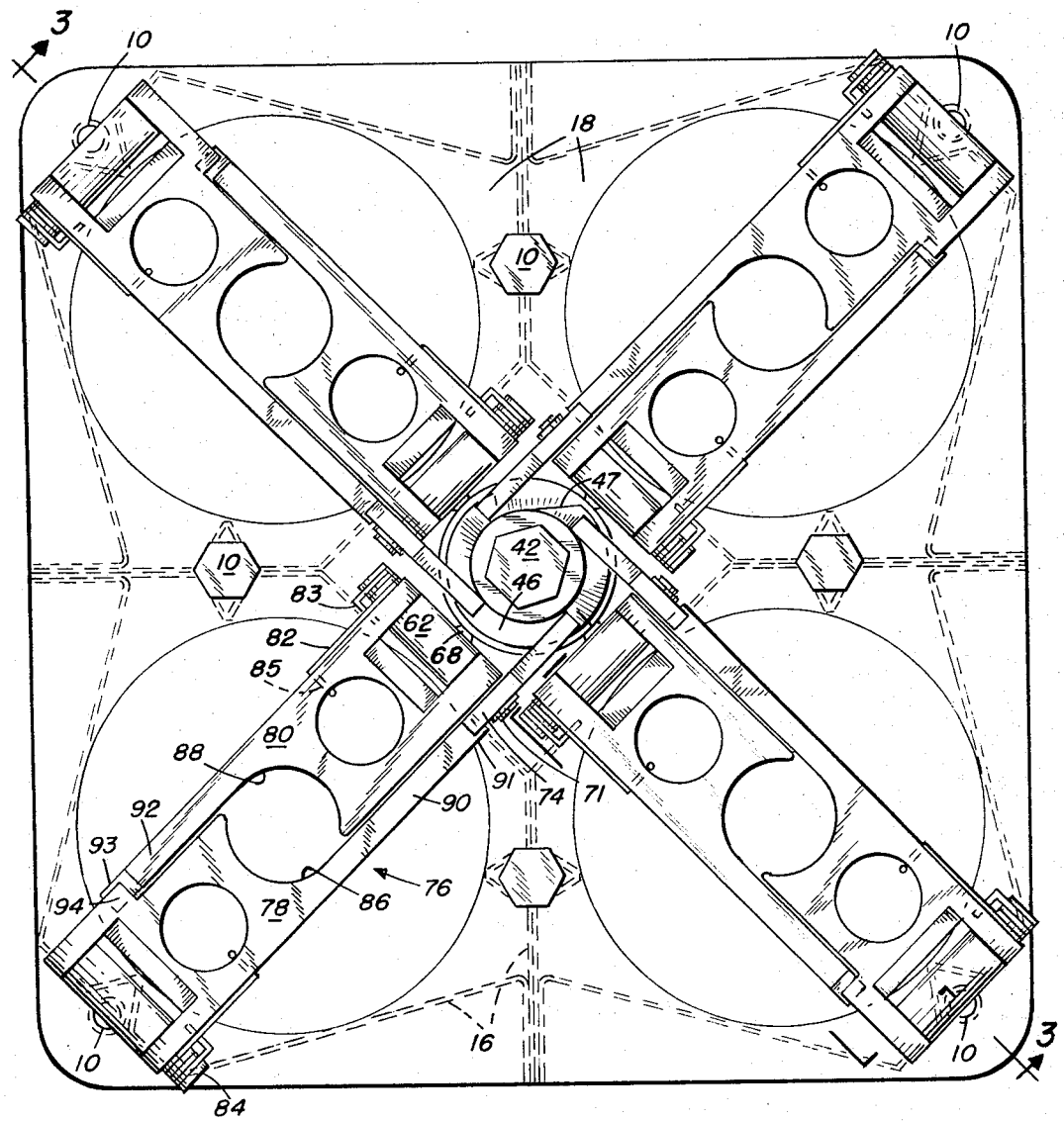
FIG. 2 is an end view of the apparatus of the instant invention illustrating the trigger mechanism thereof.
Figure 3:
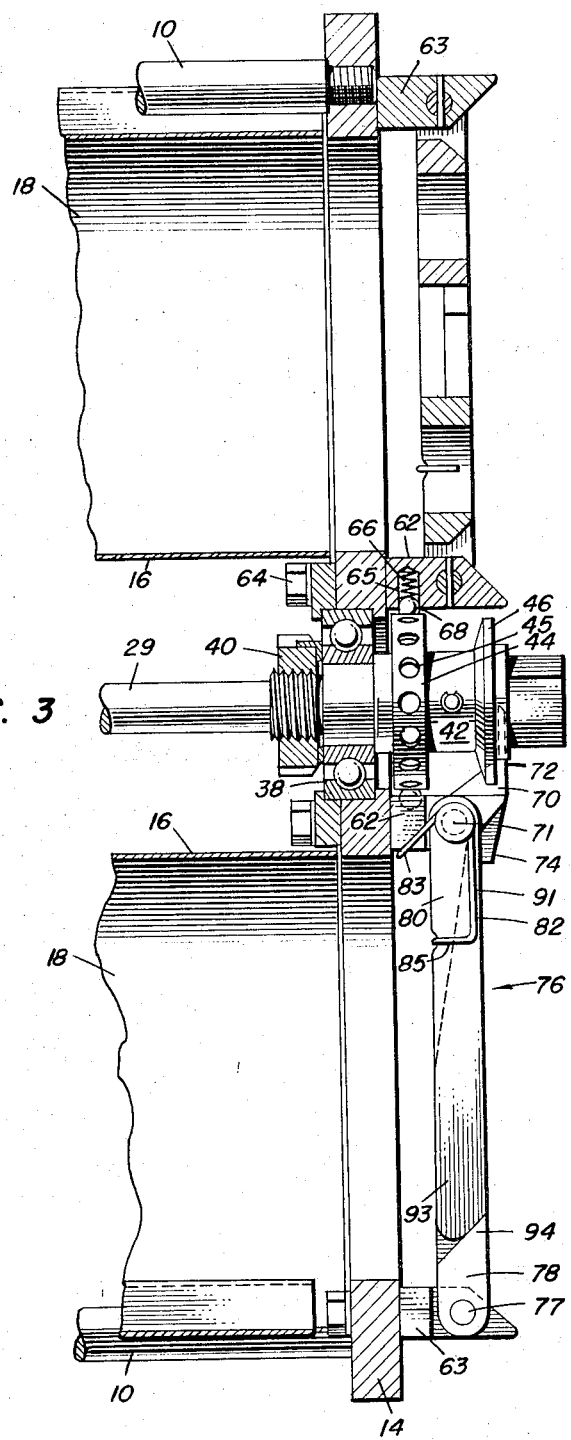
FIG. 3 is a partial section view of the device taken on the lines 3—3 of FIG. 2 looking in the direction of the arrows.

Referring now to the drawings wherein like reference characters designate like or corresponding parts throughout the several views, there is shown in FIGS. 1, 2 and 3 a frame comprised of threaded rods 10 secured to a head plate 12 and a back plate 14. A sheet metal guide cover 16 is secured to the frame to provide a plurality of bomb or store receiving compartments 18. In the preferred embodiment illustrated in the drawings, four compartments are shown for receiving four bombs; however, this embodiment is only intended to be illustrative, it being understood that either a greater or a lesser number of compartments could be utilized depending upon the size and shape of the particular bomb or store to be ejected.

A rotary solenoid indexing mechanism 20 is shown secured to head plate 12, the shaft 22 of which is journaled in bearing 24 to permit relative rotation between shaft 22 and head plate 12. A clutch mechanism, generally illustrated by reference character 25, is shown as comprising a driver member 26 having a ratchet face 27 and a driven member 28 having a ratchet face 30, the driver and driven members 26, 28 being secured to shafts 22 and 29, respectively. A compression spring 31 coaxial with shaft 29 is positioned between the driven member 28 and a cam 32, the latter being secured to a shaft 29 for rotational movement therewith. A microswitch 34 is secured to sheet metal guide cover 16 and is provided with a cam follower switch actuator 35. The particular rotary solenoid indexing mechanism 20 illustrated is designed to rotate clockwise through 90° (as viewed from the head end of the rack) each time it is energized and is spring biased so that it rotates counterclockwise through 90° back to its original position after it has completed its initial rotation. Therefore, clutch 25 is provided for permitting rotation of shaft 29 in a clockwise direction only. That is, shaft 22 rotates the driver member 26 which in turn rotates the driven member 28 and shaft 29 only through the clockwise rotation of solenoid 20. As the rotary solenoid 20 returns to its initial position, the ratchet face 30 slips over the ratchet face 27 thereby preventing shaft 29 from rotating back to its initial position along with the solenoid 20. Microswitch 34 is provided for opening the rotary solenoid power supply circuit (not shown) upon completion of each 90° rotation thereof and therefore cam 32 is provided with four distinct cam follower engaging surfaces (not shown).

Figure 4:
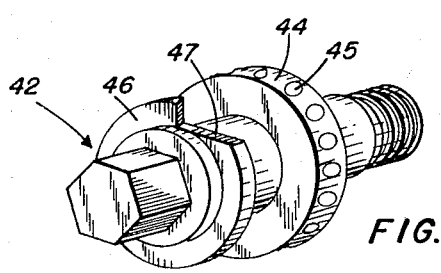
FIG. 4 is a perspective view of the rotary keeper of the present invention.

As best illustrated in FIG. 3, the other end of shaft 29 is journaled in a bearing 38 to permit relative rotation between shaft 29 and back plate 14. A bearing retainer 40 is provided to maintain bearing 38 in proper longitudinal alignment on shaft 29. A rotary keeper is secured to the end of shaft 29 adjacent bearing 38. As best illustrated in FIG. 4, rotary keeper 42 includes a detent plate 44 having a plurality of ball receiving notches 45 and a single lobed cam 46 having a recessed cam face 47.

Referring now to FIG. 1, a compression spring 48 is shown nestled within a spring shield 50 which is secured in the forward end portion of each of the compartments 18 to head plate 12 by a bolt and nut 52. A follower 54 abuts the end of compression spring 48 and is slidably disposed in the sheet metal guide cover 16. A follower stop 58 is secured to sheet metal guide cover 16 to prevent the follower 54 from being ejected along with the bomb or store. As illustrated in FIG. 1, a teardrop shaped bomb 60 is shown in the upper compartment 18 in a loaded position, and a generally cylindrically shaped bomb 61 is shown in the lower compartment 18 in a partially ejected position.

Referring now to the rearward portion of the ejector, there is shown a pair of hinge blocks 62, 63 for each bomb or store compartment 18, the blocks 62, 63 being secured to back plate 14 by threaded bolts 64. The inner hinge blocks 62 are provided with a detent ball retainer bore 65 having a detent spring 66 and detent balls 68 therein. As is apparent in FIG. 3, detent balls 68 are resiliently biased by springs 66 into engagement with the notches 45 in detent plate 44 to accurately position and secure shaft 29 when the rotary solenoid indexing mechanism 20 is not energized. A latch 70 is pivotally mounted on inner hinge blocks 62 at pivot pins 71 and comprises a cam follower portion 72 and a sear portion 74, the functions of which will be hereinafter described.

A trigger mechanism generally indicated by numeral 76 comprises a primary trigger 78 and a secondary trigger 80, the primary trigger 78 being pivotally mounted an outer hinge block 63 at pivot pin 77 and the secondary trigger 80 being pivotally mounted on inner hinge block 62 at pivot pin 71. A trigger spring 82 is coiled around pivot pin 71 and has a first leg 83 extending behind the inner hinge block 62 and a second leg 85 extending behind the secondary trigger 80. A similar trigger spring 84 is provided for the primary trigger 78. The primary and secondary triggers are each provided with a semiconductor cutaway portion 86 and 88, respectively, for cooperatively retaining the aft end of the bomb or store to be ejected. The triggers further include arm portions 90, 92, the tip 91 of arm 90 being releasably secured beneath sear 74 and the tip 93 of arm 92 being releasably secured beneath the inclined face portion 94 of trigger 78.

The operation of the retro ejector of the present invention will now be described briefly. Prior to take-off, the bomb or store retaining compartments 18 are loaded with their cargo. This is accomplished by inserting the bombs or stores into the compartments 18 until the compression springs are fully compressed and then securing the bombs or stores in place by closing and latching the trigger mechanism 76. Ejection is accomplished when desired by the pilot closing a switch which activates a circuit (not shown) controlling the operation of rotary solenoid indexing mechanism 20. As the solenoid 20 rotates, the shaft 29 and therefore the single lobed cam 46 are rotated through 90°. When the cam follower 72 on pivoted latch 70, engages the cam face 47 on the single lobed cam 46, the latch 70 together with the sear portion 74 are caused to rotate in a counterclockwise direction, as viewed in FIG. 3, thereby releasing the tip 91 of the arm portion 90 of primary trigger 78 causing this trigger, under the influence of spring 84, to rotate in a clockwise direction. When the inclined face portion 94 of the primary trigger 78 clears the tip 93 of the arm portion 92 of the secondary trigger, this trigger is then free to rotate in a counterclockwise direction thereby releasing the aft end of the bomb or store and permitting the compression spring 48 to expand and force the follower and the bomb or store rearwardly. The follower 54 is retained within the ejector by the follower stop 58, but the bomb or store is propelled out of the now opened rearward end of the ejector.

A bomb or stores ejector has therefore been described which is light in weight and characterized by simplicity of construction and in which deployment is achieved smoothly and without tumbling. This ejector is especially advantageous when used in a supersonic aircraft although, of course, it could be used in aircraft of any speed range.

It should be understood, of course, that the foregoing disclosure relates to only a preferred embodiment of the invention and that many modifications or alterations may be made therein without departing from the spirit and the scope of the invention as set forth in the appended claims.

What is claimed is:
1. A retro eject bomb rack comprising:
a frame having forward and rearward end portions and being adapted to be secured to an aircraft, said frame defining a plurality of bomb receiving compartments;
a spring and follower ejector mechanism disposed in the forward end portion of each of said compartments;
a rotary solenoid indexing mechanism secured to the forward end portion of said frame;
rotary keeper means journaled to the rearward end portion of said frame being rotated by said indexing mechanism through a one-way clutch, said keeper means comprising a detent plate and a single lobed cam;
a plurality of hinge blocks secured to the rearward end portion of said frame, at least one of said hinge blocks containing spring loaded detent balls for cooperative engagement with said detent plate;
latch means pivotally mounted to said hinge blocks comprising latch sear means and cam follower means, said cam follower means normally engaging said single lobed cam; and
spring biased trigger means comprising first and second overlapping interlocked sequentially releasable triggers which normally surround the bomb to be ejected, the first of which is released by said latch sear means and the second of which is released by said first trigger;
whereby, upon rotation of said rotary indexing mechanism, said cam follower rides down said single lobed cam thereby pivoting said sear away from said first trigger to release same, which thereafter releases said second trigger to permit ejection of the bomb by said spring.

2. A retro eject bomb rack comprising:
a frame having forward and rearward end portions and being adapted to be secured to an aircraft, said frame defining a plurality of circumferentially spaced bomb receiving compartments;
ejector means disposed in the forward end portion of said compartments;
a rotary indexing mechanism;
rotary keeper means journaled to the rearward end portion of said frame at the center of said circumferentially spaced compartments and being adapted to be rotated by said indexing mechanism, said keeper means including a single lobed cam;
latch means mounted on the rearward end portion of said frame comprising sear and cam follower means, said follower means normally engaging said cam; and
spring biased trigger means comprising overlapping sequentially releasable triggers which normally restrain the bomb from rearward movement, said trigger means being secured by said sear means;
in a manner whereby, upon rotation of said rotary indexing mechanism, said cam follower rides down said single lobed cam to effect pivoting of said sear away from said first trigger thereby to release same which thereafter releases said second trigger.

3. A retro eject bomb rack comprising
a frame providing a plurality of circumferentially spaced bomb receiving compartments;
an ejector mechanism disposed in said compartments;
an indexing mechanism secured to said frame;
a cam means mounted at the center of said compartments and secured to said indexing mechanism;
a latch means for each of said compartments pivoted to said frame, each of said latch means comprising sear and follower means, each of said follower means being normally in an engaging relationship with said cam means; and
a trigger means associated with each of said latch means, each of said trigger means being restrained by the sear of one of said latch means for normally preventing the ejection of any bombs mounted in said compartments;
each of said trigger means comprising first and second overlapping sequentially releasable spring biased triggers, the first of which is released by said sear means, the second of which is released by said first trigger means;
whereby upon the actuation of said indexing mechanism, said cam actuates one of said latch means for releasing said associated trigger means.

4. A retro eject bomb rack, as set forth in claim 3, wherein:
said ejector mechanism comprises a compression spring which is disposed in each of said bomb receiving compartments; and
said indexing mechanism comprises a reversably operable rotary solenoid which is secured to said cam means via a one way clutch.

References Cited by the Examiner
UNITED STATES PATENTS

| | | | |
|---|---|---|---|
| 1,417,500 | 5/1922 | Coley et al. | |
| 2,826,120 | 3/1958 | Lang et al. | 89—1.5 X |
| 2,905,055 | 9/1959 | Camp et al. | 89—1.5 |
| 2,971,731 | 2/1961 | Graw | 89—1.5 X |

BENJAMIN A. BORCHELT, *Primary Examiner.*

SAMUEL W. ENGLE, *Examiner.*